Feb. 5, 1924.

O. E. FOWLER 1,482,982

COMBINATION TOOL

Filed May 27, 1922

O. E. Fowler. INVENTOR

BY Victor J. Evans ATTORNEY

WITNESS:

Patented Feb. 5, 1924.

1,482,982

UNITED STATES PATENT OFFICE.

OLIVER E. FOWLER, OF BALDWIN, GEORGIA.

COMBINATION TOOL.

Application filed May 27, 1922. Serial No. 564,216.

*To all whom it may concern:*

Be it known that I, OLIVER E. FOWLER, a citizen of the United States, residing at Baldwin, in the county of Habersham and State of Georgia, have invented new and useful Improvements in Combination Tools, of which the following is a specification.

This invention contemplates providing a saw with a tape measure and associating said parts in a manner whereby timber to be sawed can be quickly and conveniently measured, the invention residing in the construction, combination, and arrangement of parts as claimed.

In the drawing forming part of this application, like numerals of reference indicate similar parts in the several views, and wherein:—

Figure 1:
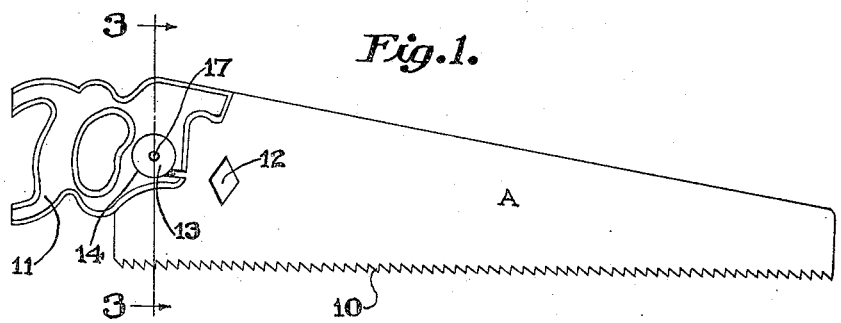
Figure 1 is a view in elevation of the saw equipped with the measuring device in accordance with the present invention.
Figure 2:
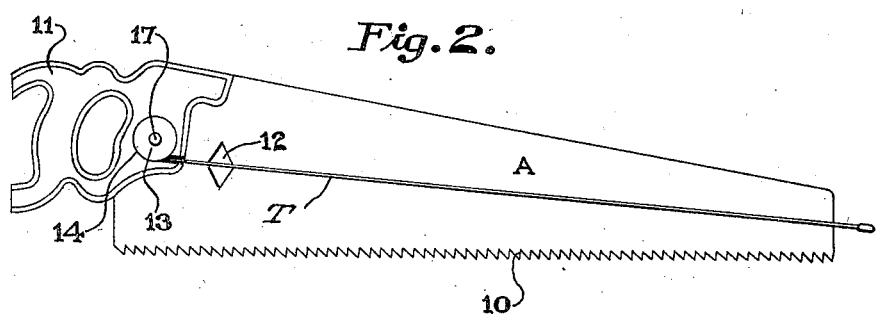
Fig. 2 is a view showing the tape extended for use.
Figure 3:
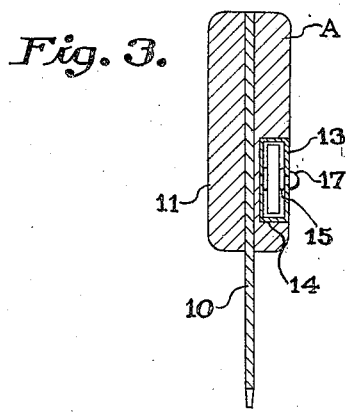
Fig. 3 is a sectional view taken on line 3—3 of Fig. 1.
Figure 4:
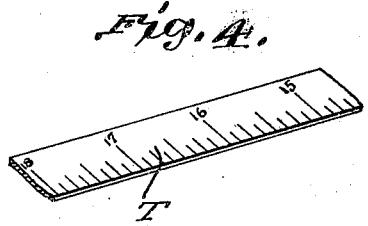
Fig. 4 is a fragmentary view of the graduated tape.

Referring to the drawing in detail, A indicates a handsaw of any well known construction, wherein the blade is indicated at 10 and the handle at 11. The blade 10 is provided with an opening 12 adjacent the handle, and the purpose of this opening will be presently described.

The graduated measuring device comprises a casing 13 which is received by a recess 14 provided in the handle, the measuring tape T being adapted to be wound about and unwound from a spool 15 which is arranged within the casing. The measuring device in its entirety is of well known construction having a spring associated therewith to automatically rewind the graduated tape about the spool when the button 17 is depressed. The parts are arranged so that the tape will lie flat against the blade of the saw when the tape is extended for use. The saw is adapted to be arranged upon the lumber to be measured, and the tape extended for this purpose, and the tape can be conveniently read through the opening 12 in the blade, should it happen that the saw be laid upon the timber with the tape between the latter and the saw. The casing forming part of the measuring device is arranged in an out-of-the-way position so as not to interfere with the use of the saw.

While it is believed that from the foregoing description, the nature and advantages of the invention will be readily apparent, I desire to have it understood that I do not limit myself to what is herein shown and described, and that such changes may be resorted to when desired as fall within the scope of what is claimed.

What I claim is:—

A lumber measuring device for saws having a handle and a sight opening in the blade thereof adjacent the handle, said measuring device comprising a graduated tape, a casing arranged in a recess in the handle, a spring-actuated spool mounted for rotation in the case and about which the tape is adapted to be wound and unwound, and said tape being arranged longitudinally of the saw when in use and traversing the sight opening whereby the tape can be read from the opposite side of the saw as specified.

In testimony whereof I affix my signature.

OLIVER E. FOWLER.